United States Patent Office 2,949,476
Patented Aug. 16, 1960

2,949,476

16-ALKYLESTRATRIENE-3,16,17-TRIOLS AND DERIVATIVES THEREOF

David A. Tyner, Skokie, Ill., assignor to G. D. Searle & Co., Chicago, Ill., a corporation of Delaware No Drawing. Filed Jan. 8, 1957, Ser. No. 632,980

10 Claims. (Cl. 260—397.5)

The present invention relates to 16-alkylestratriene-3, 16,17-triols, to ethers and esters thereof, and to methods for their manufacture. The compounds of the present invention can be represented by the structural formula

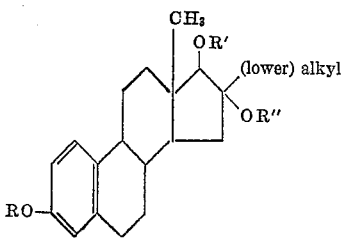

wherein R and R' can be selected from the group consisting of hydrogen, hydrocarbon radicals, and the acyl radicals of hydrocarbon carboxylic acids; and R" can be selected from the group consisting of hydrogen and the acyl radicals of hydrocarbon carboxylic acids. Hydrocarbon radicals which R and R' can represent include such lower alkyl radicals as methyl, ethyl, propyl, butyl, amyl, hexyl, heptyl, octyl and branched-chain isomers of the foregoing, as well as such cyclic hydrocarbon radicals as cyclopentyl, cyclohexyl, cyclohexylmethyl, benzyl, methylbenzyl, and phenethyl. Among the acyl radicals which R, R', and R" can represent are particularly the acyl radicals of hydrocarbon carboxylic acids containing fewer than 9 carbon atoms. Examples of such acyl groups are formyl, acetyl, propionyl, butyryl, valeryl, hexanoyl, heptanoyl, octanoyl, cyclohexanecarbonyl, cyclohexaneacetyl, cyclopentanepropionyl, benzoyl, phenylacetyl and isomers and homologs of the foregoing.

Suitable starting materials for the manufacture of the compounds of the present invention can be represented by the structural formula

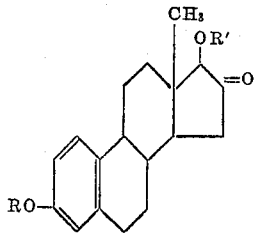

wherein R and R' are defined as hereinbefore. The compounds comprehended as starting materials consequently include 16-ketoestradiol and its ethers and esters broadly; however, compounds of the foregoing formula which have a free phenolic group at position 3 are not preferred starting materials because of competing reactions which they are capable of undergoing. Stereochemically, the compounds used as starting materials for the manufacture of the compounds of the present invention are particularly those in which the hydroxyl group, or esterified or etherified hydroxyl group, at position 17 has the same configuration as the 17-hydroxyl group of the natural ovarian hormone estradiol. At the present time this hydroxyl group or functionally-converted hydroxyl group is understood to be in the beta, or cis configuration, although this stereochemical relationship was not adequately appreciated during earlier investigations in the estrane series. Consequently, starting materials employed herein have been characterized in earlier chemical literature under names which are not in precise accord with modern terminology; typically, they have been described under such designations as derivatives of 16-ketoestradiol and of 16-keto-α-estradiol. It is to be understood that the stereochemical configuration of the 17-substituent of the starting materials comprehended herein as well as of the described reaction products is the same as that of the natural ovarian hormone estradiol, sometimes referred to by the trivial designations α-estradiol or estradiol-17β. Specific starting materials employed in the procedures disclosed herein have been described in such places as Journal of Biological Chemistry, 169, 167 (1947); Journal of Biological Chemistry, 172, 325 (1948); Journal of the American Chemical Society, 71, 725 (1949); and U.S. Patent 2,522,177.

Compositions of the present invention can be prepared by treating an ether or an ester of 16-ketoestradiol with an organometallic compound such as an alkylmagnesium halide or an alkyllithium and decomposing the intermediate organometallic addition product with an acidic reagent, such as ammonium chloride, hydrochloric acid or sulfuric acid. As a specific example, reaction of 16-ketoestradiol 3-monomethyl ether in a hydrocarbon or ethereal solvent with methylmagnesium bromide in an ethereal solvent followed by treatment of the reaction mixture with an excess of aqueous ammonium chloride affords 3-methoxy-16-methyl-1,3,5(10)-estratriene-16,17-diol. The same compound is obtained by the use of methylmagnesium chloride or methylmagnesium iodide in place of the methylmagnesium bromide. Compounds having other lower alkyl groups at position 16 are obtained by a suitable selection of the organometallic reagent. Typical of such reagents are ethylmagnesium bromide, ethyllithium, propylmagnesium bromide, butylmagnesium iodide and octyllithium.

When an excess of the organometallic reagent is employed in the reaction of an alkylmagnesium halide with an ester of 16-ketoestradiol, addition to the ketonic carbonyl group is accompanied by conversion of ester groups present in the molecule to hydroxyl groups. This affords a convenient method of preparing the free triols of this invention. For example, reaction of 16-ketoestradiol diacetate with an excess of methylmagnesium bromide followed by treatment of the reaction mixture with an acidic reagent yields 16-methyl-1,3,5(10)-estratriene-3,16,17-triol. The same compound is obtained by using a smaller amount of the methylmagnesium bromide and conducting the hydrolysis of the ester groups as a separate operation.

The addition of an organometallic reagent to the ketonic carbonyl group of 16-ketoestradiol and its ethers and esters can lead to the formation of stereoisomeric products. Although both possible stereoisomers are formed, in actual practice it is found that one of the stereoisomers predominates, and that upon subjecting the crude reaction product to recrystallization, the crystalline product obtained consists substantially of a single stereoisomer. In the examples to follow, compositions described are exclusively or principally the predominant stereoisomers except where otherwise indicated. A determination of the stereochemical configuration of the predominant isomer is not necessary in the identification of the compounds or in employing the claimed compositions in their intended applications. However, the addition of an organometallic reagent to a 16-keto group is subject to influences analogous to those which prevail during the addition of an organometallic reagent to a 17-keto group, in accordance with which it would be expected that the predominant mode of reaction would be such that the 16-alkyl group would enter trans, and the 16-hydroxyl group cis, to the β-hydroxyl group or other β-substituent at position 17 and to the angular methyl group at position 13. Precisely the expected behavior is observed for representative compounds of this invention. For example, upon reaction of 16-ketoestradiol 3-monoethyl ether with methylmagnesium bromide and hydrolysis of the primary reaction product, the stereoisomeric 3-methoxy-16-methyl-1,3,5(10)-estratriene-16,17-diol formed in greater amount, and isolated by direct crystallization, is the stereoisomer in which the 16-hydroxyl group is cis with respect to the 17-hydroxyl group. This conclusion, which is in accord with general scientific principles referred to hereinbefore as well as with a body of molecular rotation data presently available to prior art to persons working in the field of steroid chemistry, is supported by the findings that the aforementioned predominant isomer of 3-methoxy-16-methyl-1,3,5(10)-estratriene-16,17-diol affords an acetonide upon treatment with acetone in the presence of an acidic catalyst, and that the original isomer is regenerated by hydrolysis of the acetonide, thereby indicating that the 16- and 17-hydroxyl groups are similarly oriented.

The stereoisomers formed in relatively smaller amount, in which isomers the groups at position 16 are inversely oriented, are obtained by chromatographic fractionation of the crystallization liquors of the corresponding predominant isomers. They afford ethers and esters upon treatment with appropriate reagents as described in the cases of the predominant isomers. These stereoisomers are also obtained by converting a 17-ketone of the estrone series to a 16-alkylidene derivative, as by reaction with an aldehyde and dimethylamine hydrochloride, followed by forming the epoxide with a peroxide such as hydrogen peroxide, and hydrogenating the product with a reducing agent such as lithium aluminum hydride in ether.

By a suitable selection of starting materials and subsequent etherification and esterification operations, various ethers and esters of the parent 16-alkyl-1,3,5(10)-estratriene-3,16,17-triols can be prepared. For example, reaction of the free trihydroxy compounds with a hydrocarbon carboxylic acid anhydride or a hydrocarbon carboxylic acid halide in a basic reaction medium, suitably pyridine, leads to the formation of a 3,17-diester under relatively mild conditions, the tertiary hydroxyl group at position 16 resisting esterification unless the reaction is conducted under more vigorous conditions or in the presence of an acidic catalyst. Under conditions of acidic catalysis, each of the free hydroxyl groups can be esterified by heating with an acylating agent such as a hydrocarbon carboxylic acid anhydride. This method affords a convenient means for the preparation of ester derivatives of the 16-hydroxyl group. The ethers of the present invention can be prepared by conducting the reaction with the organometallic reagent with a corresponding mono- or di-ether of 16-ketoestradiol, or, alternatively, by treating a 16-alkyl-1,3,5(10)-estratriene-3,16,17-triol with an alkylating agent, an arylating agent, or an aralkylating agent, such as methyl iodide, dimethyl sulfate, or benzyl chloride, in the presence of a basic condensing agent. Mixed ethers and esters can be obtained by suitable modifications of these procedures. For example, the steps which comprise treating 16-ketoestradiol 3-monobenzyl ether with ethylmagnesium iodide, decomposing the reaction mixture with an acidic reagent such as aqueous ammonium chloride solution, isolating the reaction product and treating it in pyridine solution with acetic anhydride, yield 3-benzyloxy-16-ethyl-17-acetoxy-1,3,5(10-estratrien-16-ol.

Mono esters of 16-alkyl-1,3,5(10)-estratriene-3,16,17-triols can be prepared by selective acylation and selective hydrolysis reactions. Thus, reaction of the triol with one molecular equivalent of acetic anhydride yields the 3-acetoxy derivative, while mild hydrolysis of the 3,17-diacetate yields the 17-acetoxy derivative.

The compounds of the present invention have valuable pharmacological properties. Broadly, their usefulness in therapeutics can be said to result from the fact that they exhibit certain of the biological characteristics which are associated with the natural estrogenic hormones, while at the same time they exhibit remarkably little estrogenic activity. It is well known that certain therapeutic applications of estrogenic hormones such as estrone and estradiol are limited and, in many cases, made entirely impractical because of the feminizing effects which they produce. One of these therapeutic applications is in the treatment of degenerative diseases associated with abnormal cholesterol metabolism and deposition. It is recognized that estrogenic hormones exhibit an inhibitory and consequently beneficial effect on the arterial deposition of cholesterol, and it is widely agreed that this so-called anti-atherogenic effect is achieved by a reduction in the serum ratio of cholesterol to phospholipids. This result is commonly, but not necessarily, accompanied both by a reduction in the serum concentration of cholesterol and an increase in the serum concentration of phospholipids. The reduction in the serum ratio of cholesterol to phospholipids can be designated as a "lipid effect" and regarded as a measure of anti-atherogenic activity; and for any particular compound quantitative comparisons can be made between this effect and the "estrogenic effect" associated therewith. It has been found that in the compositions of the present invention the ratio of the lipid effect to the estrogenic effect has been markedly increased over the corresponding ratios which are characteristic of the natural estrogenic hormones. In consequence of this greatly increased ratio, valuable lipid effects can be produced at dosage levels at which no feminizing effects whatever are observed.

The compounds of this invention are useful in the treatment of hypercholesterolemia and disorders associated therewith. Because of their selectivity of biological action they can achieve other responses of the estrogenic hormones without producing a corresponding feminization. The compositions disclosed herein consequently have broad applications in the treatment of cardiovascular and circulatory disorders.

Still another pharmacological application of these compounds is as an adjunct to sex hormone therapy. For example, although these compositions have extremely slight estrogenic activity of their own, when co-administered with a potent estrogen, such as estrone, they produce a significant increase in the estrogenic response elicited by the latter hormone. This enhancement of estrogenic effect is considered remarkable as it is at variance with the behavior of such structurally related compounds as estriol. The potentiation is highly selective and is of particular intensity when the experimentally determined dosage relationship is optimal; at unfavorable dosage relationships the potentiation becomes relatively insignificant, reflecting the complexity of the problem of steroid interaction. In contrast to the behavior of the compositions of this invention, antagonism rather than potentiation of potent estrogens is known to be associated with estriol (Hisaw, Velardo and Goolsby, Journal of Clinical Endocrinology and Metabolism, 14, 1134 (1954)) and with 16-epiestriol (Velardo and Sturgis, Proceedings of the Society for Experimental Biology and Medicine, 90, 609 (1955)).

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.) and quantities of materials in parts by weight.

The present application is a continuation-in-part of my copending application Serial No. 563,447, filed February 6, 1956, now abandoned.

Example 1

A solution of 100 parts of 16-ketoestradiol 3-monomethyl ether in 660 parts of benzene is rendered anhydrous by removing about 40 parts of benzene as a distillate. (The remaining solution is cooled to room temperature and is maintained in an anhydrous condition in a nitrogen atmosphere during the following operations, until the reaction mixture is finally decomposed with ammonium chloride solution.) The benzene solution is treated by the gradual addition of a 3 molar solution of methylmagnesium bromide in butyl ether containing a total of 100 parts of methylmagnesium bromide. A precipitate which forms redissolves during the course of the reaction. After the addition of the methylmagnesium bromide solution has been completed, the reaction mixture is stirred for an additional hour and then, to insure completion of the reaction, it is heated under reflux for 16 hours. The mixture is then treated with a large excess of saturated ammonium chloride solution in order to decompose the organometallic compound which is the primary product of the reaction. Caution is required during this operation because the reaction mixture passes through a gel stage which foams extensively as a result of the methane liberated in the decomposition of the excess methylmagnesium bromide. Upon completion of the addition of the ammonium chloride solution, the mixture consists of a crystalline solid suspended in the aqueous phase, and an organic solvent phase. The organic solvent phase is separated, and the crystalline solid is collected from the aqueous phase and washed with aqueous ammonium chloride and with water; this product represents about 90% of the theoretical amount and is of satisfactory purity for most uses. An additional quantity of crude product is obtained by combining an ethyl acetate extract of the aqueous phase with the original organic phase, washing with aqueous ammonium chloride and with water, and concentrating to dryness under reduced pressure. Further purification by recrystallization from benzene containing a small amount of acetone yields 3-methoxy-16-methyl-1,3,5(10)-estratriene-16,17-diol melting at about 179–181° C. This compound has a specific rotation of about +71° in dioxane solution. It has the structional formula

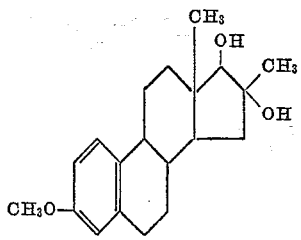

This compound does not exhibit the potent hypotensive activity associated with structurally-related estrogens.

A modification of the foregoing procedure especially recommended for large-scale operation, is as follows. A solution of 100 parts of 16-ketoestradiol 3-monomethyl ether in 660 parts of benzene is rendered anhydrous by removing about 40 parts of benzene as a distillate. (The remaining solution is maintained in an anhydrous condition under a nitrogen atmosphere until the reaction mixture is decomposed with dilute acid.) The stirred, refluxing benzene solution is treated with a 3 molar solution of methylmagnesium bromide in butyl ether containing a total of 100 parts of methylmagnesium bromide. A precipitate which forms redissolves during the course of the reaction. After the addition of the methylmagnesium bromide solution has been completed, the reaction mixture is stirred and maintained under reflux for an additional 2 hours. The excess methylmagnesium bromide is decomposed by the addition of a benzene solution containing 16 parts of acetone, after which the entire mixture, stirred vigorously and cooled with an external ice bath, is treated with 1100 parts of cold, 10 percent sulfuric acid. In this operation the magnesium salts are hydrolyzed and most of the desired product separates as a crystalline solid. This product is collected on a filter, and washed with a small quantity of cold benzene, with cold 10 percent sulfuric acid, and then with water until neutral. This material represents about 90 percent of the theoretical amount and is of satisfactory purity for most uses; an additional quantity of crude product can be isolated from the organic solvent phase. Upon recrystallization from a mixture of benzene and acetone there is obtained purified 3-methoxy-16-methyl-1,3,5(10)-estratriene-16,17-diol as described hereinbefore.

If a product entirely free of inorganic salts is desired, this can be obtained by partitioning the crude product between chloroform and water, washing the chloroform phase with 10% mineral acid and then with water until neutral, rendering the chloroform solution anhydrous, concentrating to a low volume, and effecting crystallization by dilution with hot benzene.

Example 2

A reaction mixture consisting of 175 parts of 16-ketoestradiol, 300 parts of potassium carbonate, 4000 parts of ethanol and 2000 parts of ethyl iodide is heated under reflux in a nitrogen atmosphere for 6 hours. It is then concentrated to about one-half of its original volume and diluted with a total of about 10,000 parts of hot water added in small portions. A solid product precipitates during this operation. The mixture is refrigerated, and the solid product is collected on a filter and washed with water. By recrystallization from mixtures of benzene and ethanol there is obtained 16-ketoestradiol 3-monoethyl ether melting at about 180–184° C.

An anhydrous solution of 46 parts of 16-ketoestradiol 3-monoethyl ether in 1800 parts of benzene is treated by the gradual addition of a 3 molar solution of methylmagnesium bromide in butyl ether containing a total of 40 parts of methylmagnesium bromide. The reaction mixture is maintained under reflux in a nitrogen atmosphere for 2 hours, after which acetone is added to react with the excess methylmagnesium bromide. The cooled mixture is then stirred with an excess of saturated ammonium chloride solution and with dilute sulfuric acid, after which the organic phase is separated and washed with additional dilute sulfuric acid, with several portions of water, and with sodium chloride solution. It is then dried and concentrated by vaporization of the solvent to afford an oily or semi-crystalline residue. This residue is washed with petroleum ether and then recrystallized from benzene to afford 3-ethoxy-16-methyl-1,3,5(10)-estratriene-16,17-diol melting at about 175–177° C. after prior softening. The structural formula is

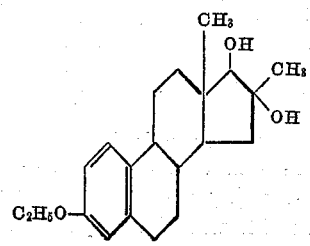

Example 3

To an anhydrous solution of 2.4 parts of 16-ketoestradiol 3-monomethyl ether in 20 parts of benzene, in a reaction vessel swept with nitrogen, is gradually added a 3 molar solution of ethylmagnesium bromide in ethyl ether containing a total of 2.6 parts of ethylmagnesium bromide. The reaction mixture is maintained under reflux for 2 hours, after which acetone is added to react with the excess ethylmagnesium bromide. The cooled mixture is washed thoroughly with dilute sulfuric acid, and with water to neutrality. The separated organic phase is then brought to dryness by vaporization of the solvents, and the residual product is recrystallized from aqueous acetone and from a mixture of acetone and cyclohexane. Due to different crystalline modifications, the compound can exhibit anomalous melting point behaviour. The stable crystalline modification of 3-methoxy-16-ethyl-1,3,5(10)-estratriene-16,17-diol obtained as described hereinabove melts at about 130–131° C. The structural formula is

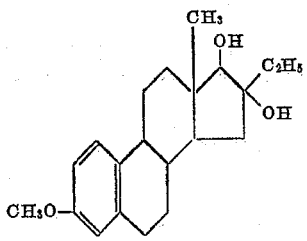

The same compound is obtained by the substitution of 3.4 parts of ethylmagnesium iodide for the ethylmagnesium bromide in the foregoing procedure.

Example 4

A solution of 1 part of 3-methoxy-16-methyl-1,3,5(10)-estratriene-16,17-diol in 10 parts of pyridine and 10 parts of acetic anhydride is allowed to stand at about 25° C. for 16 hours. The mixture is then gradually diluted with ice water, and crystallization is induced. When separation of the solid product is complete, it is collected on a filter and washed with water. Purification by successive crystallizations from benzene containing a small amount of acetone and from ethanol yields 3-methoxy-16-methyl-17-acetoxy-1,3,5(10)-estratrien-16-ol melting at about 147–148.5° C. This compound has the structural formula

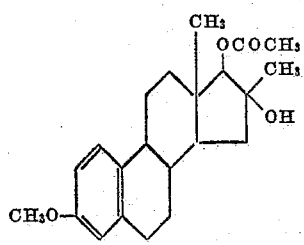

Example 5

A solution of 5 parts of 3-methoxy-16-methyl-1,3,5-(10)-estratriene-16,17-diol in 50 parts of pyridine and 15 parts of butyric anhydride is allowed to stand at about 25° C. for 48 hours. The mixture is then gradually diluted with ice water, and crystallization is induced. The solid product is collected on a filter and washed with water. Purification by recrystallization from mixtures of acetone and benzene or from ethanol yields 3-methoxy-16-methyl-17-butyroxy-1,3,5(10)-estratrien-16-ol.

Example 6

A solution of 1 part of 3-methoxy-16-methyl-1,3,5-(10)-estratriene-16,17-diol in 5 parts of pyridine is cooled to about 5° C. and treated with 0.6 part of benzoyl chloride. The reaction mixture is maintained at about 5° C. for 2 hours and is then allowed to stand at about 25° C. for 18 hours. Ice water is slowly added, with stirring, to decompose the unreacted benzoyl chloride and to precipitate the crude reaction product. The solid product is collected on a filter and crystallized from a mixture of benzene and ethanol and then from ethanol, whereby there is obtained 3-methoxy-16-methyl-17-benzoyloxy-1,3,5(10)-estratrien-16-ol which melts at about 145–146.5° C. and has the structural formula

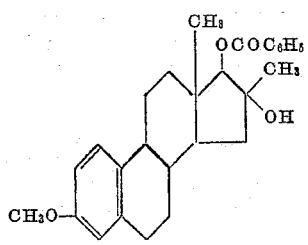

Example 7

A solution of 1 part of 3-methoxy-16-methyl-1,3,5(10)-estratriene-16,17-diol in 3 parts of pyridine is treated with 3 parts of β-cyclopentylpropionyl chloride. There are observed an evolution of heat, a coloration of the reaction mixture, and the precipitation of a solid material. The mixture is allowed to stand at about 25° C. for 18 hours, and is then mixed with several times its volume of ice water. The gummy, insoluble product is washed by decantation with water and dissolved in ethyl acetate. The organic solution is washed with dilute hydrochloric acid, with dilute potassium carbonate solution, and then with several portions of water. The gummy product obtained by evaporation of the ethyl acetate solution is dissolved in benzene, and the benzene solution is poured onto a chromatography column prepared from 100 parts of silica. The column is eluted with benzene and with mixtures of benzene and ethyl acetate containing small and gradually increasing amounts of ethyl acetate. By elution with a 5 volume percent solution of ethyl acetate in benzene, there are obtained fractions which, upon vaporization of the solvents, afford the desired ester as a very viscous oil. When this compound is crystallized from methanol at about 0° C., it is obtained as fine needles melting in the range of about 30–35° C. The crystalline form can also be lost upon storage at room temperature, under which circumstances the compound can form a glass-like material. This compound is 3-methoxy-16-methyl-17-cyclopentylproprionoxy-1,3,5(10)-estratrien-16-ol, which has the structural formula

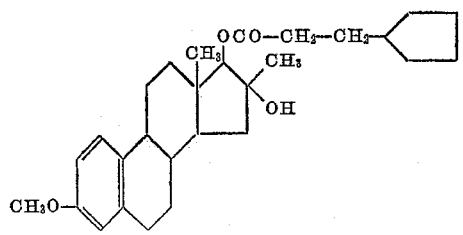

Example 8

An anhydrous solution of 7 parts of 16-keto-estradiol 3-monobenzyl ether in 220 parts of benzene is treated in a nitrogen atmosphere by the gradual addition of a 3 molar solution of methylmagnesium bromide in butyl ether containing a total of 18 parts of methylmagnesium bromide. The resulting mixture is heated under reflux for 18 hours, and is then cooled and treated with an excess of saturated ammonium chloride solution. The organic phase is separated and washed with additional portions of ammonium chloride solution and with saturated sodium chloride solution, and is then concentrated to dryness. Recrystallization of the residue from ethanol or from aqueous ethanol yields 3-benzyloxy-16-methyl-1,3,5(10)-estratriene-16,17-diol melting at about 173–176° C. and having a specific rotation of about +60° in dioxane solution. This compound has the structural formula

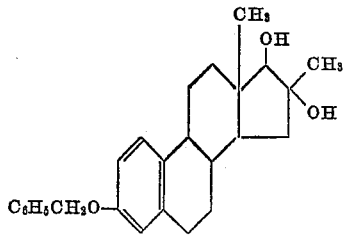

Example 9

A mixture of 2 parts of 16-ketoestradiol, 4 parts of p-methylbenzyl chloride, 80 parts of absolute ethanol and 5 parts of anhydrous potassium carbonate is heated under reflux for 3 hours. Water is added in order to dissolve the precipitated potassium chloride and precipitate the organic product. When separation of the reaction product is complete, it is collected on a filter and washed with water. This product is 16-ketoestradiol 3-mono-(p-methylbenzyl) ether. Substitution of 7 parts of this compound for the 16-ketoestradiol 3-monobenzyl ether in the procedure of Example 8 affords 3-(p-methylbenzyloxy)-16-methyl-1,3,5(10)-estratriene-16,17-diol of the structural formula

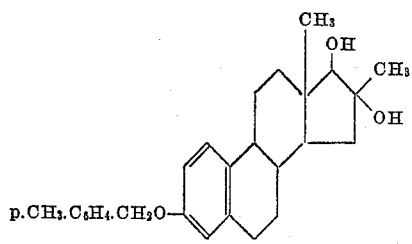

Example 10

By the procedure of Example 8, with the substitution of a solution of n-propylmagnesium bromide in butyl ether containing a total of 22 parts of propylmagnesium bromide, for the solution of methylmagnesium bromide in butyl ether, there is obtained 3-benzyloxy-16-propyl-1,3,5(10)-estratriene-16,17-diol of the structural formula

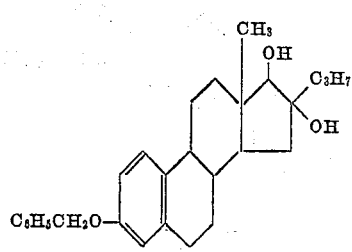

Example 11

A solution of 8 parts of 16-ketoestradiol in 20 parts of pyridine and 20 parts of acetic anhydride is heated at about 80° C. for 2 hours and is then allowed to cool to room temperature. The unreacted acetic anhydride is decomposed by the cautious addition of water with external cooling, and the mixture is then diluted with about 200 parts of water and chilled until separation of the insoluble product is complete. This product is collected on a filter and washed with water. Purification by recrystallization from methanol yields 16-ketoestradiol diacetate (3,17 - diacetoxy - 1,3,5(10) - estratrien - 16 - one) melting at about 137–139° C. This compound has the structural formula

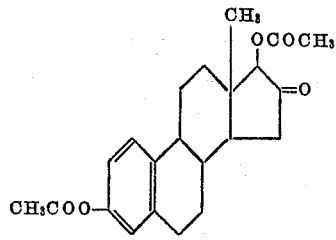

Example 12

An anhydrous solution of 160 parts of 3,17-diacetoxy-1,3,5(10)-estratrien-16-one in 2700 parts of benzene is treated in a nitrogen atmosphere with a solution of methylmagnesium bromide in butyl ether containing a total of 107 parts of methylmagnesium bromide. It is suitable to use a solution of methylmagnesium bromide containing about 357 parts of methylmagnesium bromide per liter. The resulting mixture is heated under reflux for 18 hours, and is then cooled and shaken with an excess of saturated ammonium chloride solution. Sufficient ethyl acetate is added to dissolve substantially all of the reaction product, and the organic phase is separated and washed with saturated ammonium chloride solution and with saturated sodium chloride solution. The organic phase is dried and concentrated under reduced pressure whereupon there is obtained a gummy, solid product. Purification by successive crystallizations from a mixture of acetone and benzene and from aqueous methanol, followed by thoroughly drying the crystallizate at about 100° C. in a vacuum, yields 16-methyl-1,3,5(10)-estratriene-3,16,17-triol melting at about 249–259° C. and having a specific rotation of about +74.6° in dioxane solution. This compound has the structural formula

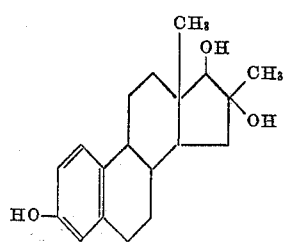

Example 13

A solution of 8 parts of 16-methyl-1,3,5(10)-estratriene-3,16,17-triol, 75 parts of pyridine and 50 parts of acetic anhydride is allowed to stand at about 25° C. for 18 hours. Water is added cautiously, until the unreacted acetic anhydride is hydrolyzed, and the mixture is then diluted with several times its volume of water. When separation of the insoluble product is complete, it is collected on a filter and washed with water. This compound is 3,17-diacetoxy-16-methyl-1,3,5(10)-estratrien-16-ol, which after recrystallization from aqueous ethanol melts at about 157–161° C. The structural formula is

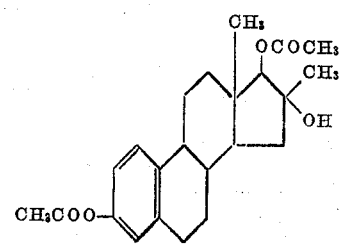

Example 14

By the procedure of Example 13, with the substitution of 50 parts of propionic anhydride for the acetic anhydride, there is obtained 3,17-dipropionoxy-16-methyl-1,3,5(10)-estratrien-16-ol.

Example 15

In a reaction vessel swept with nitrogen and cooled with an external ice bath, a stirred solution of 10 parts of 16-ketoestradiol in 80 parts of dioxane is treated with a 1 molar solution of potassium tertiary butoxide in tertiary butyl acholol containing a total of 3.9 parts of potassium tertiary butoxide. The reaction mixture, which now contains a precipitated salt, is stirred at about 5° C. for an additional 10 minutes. The ice bath is removed, and when the mixture has warmed almost to room temperature, there is added 45 parts of methyl iodide. The mixture is stirred at room temperature for an additional 30 minutes, and is then heated under reflux for 1 hour. Substantially all of the excess methyl iodide is removed by distillation, and the hot solution which remains is diluted with hot water to initiate crystallization. After cooling and refrigeration the mixture is filtered and the solid product is washed with aqueous ethanol and dried. Upon recrystallization from benzene or from ethanol there is obtained 16-ketoestradiol dimethyl ether (3,17-dimethoxy-1,3,5(10)-estratrien-16-one) melting at about 199–212° C.

An anhydrous solution of 2 parts of 16-ketoestradiol dimethyl ether in 45 parts of benzene, in a reaction vessel swept with nitrogen, is treated gradually with a 3 molar solution of methylmagnesium bromide containing a total of 1.8 parts of methylmagnesium bromide. The reaction mixture is maintained under reflux for 3 hours, after which acetone is added to react with the excess methylmagnesium bromide. The mixture is cooled and stirred well with an excess of saturated ammonium chloride solution and with dilute sulfuric acid. The separated organic phase is washed with additional dilute sulfuric acid, with several portions of water and with sodium chloride solution, after which it is dried and concentrated by vaporization of the solvents to afford an oily or semi-crystalline residue. This residue is washed with petroleum ether and then purified by recrystallization from cyclohexane. In this manner there is obtained 3,17-dimethoxy-16-methyl-1,3,5(10)-estratrien-16-ol which melts at about 110.5–112° C. after prior softening and has the structural formula

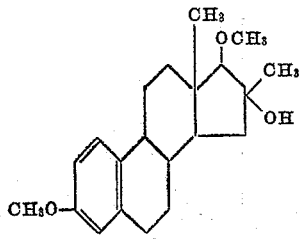

In the same manner the reaction of 16-ketoestradiol in dioxane solution with potassium tertiary butoxide in tertiary butyl alcohol, and subsequently with ethyl iodide, affords 16-ketoestradiol diethyl ether, which yields 3,17-diethoxy-16-methyl-1,3,5(10)-estratrien-16-ol upon treatment with methylmagnesium bromide and acidic decomposition of the primary reaction product as described hereinabove.

Example 16

A mixture of 20 parts of 3-methoxy-16-methyl-1,3,5(10)-estratriene-16,17-diol, 1 part of p-toluene-sulfonic acid monohydrate and 100 parts of acetic anhydride is heated at about 90–100° C. for 2 hours. The cooled reaction mixture is diluted with ice water, and crystallization of the oily, insoluble reaction product is induced. This product is collected on a filter, washed with water, and recrystallized from aqueous ethanol to afford a crystallizate comprising a major proportion of the desired compound and a minor proportion of a higher melting by-product. Most of the higher melting by-product can be removed by crystallization from about 225 parts of a mixture of benzene and cyclohexane containing equal parts by volume of each solvent component; from this medium the higher melting by-product separates as needle-like crystals. Residual quantities of this by-product can be removed from the crystallization liquor by adsorption on silica, by such means as passing the crystallization liquor through a short silica column and washing the colum with a small quantity of benzene, under which circumstances the desired compound is recovered from the solution and the by-product remains substantially adsorbed on the silica. Upon vaporization of the solvent and recrystallization of the residue from methanol there is obtained purified 3-methoxy-16-methyl-1,3,5(10)-estratriene-16,17-diol diacetate which melts at about 145–147° C. and has a specific rotation of about +81° in chloroform solution. The structural formula is

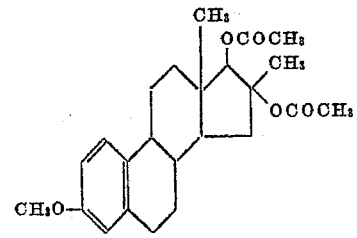

Example 17

A mixture of 10 parts of 3-ethoxy-16-methyl-1,3,5(10)-estratriene-16,17-diol, 1 part of p-toluene-sulfonic acid monohydrate and 60 parts of propionic anhydride is heated at about 90–100° C. for 2 hours. The cooled reaction mixture is diluted with ice water, and the insoluble product which separates is collected, washed with water, and dissolved in benzene. The benzene solution is dried and poured on a short column prepared from about 50 parts of silica. The column is eluted with an additional portion of benzene, and the combined benzene solution is concentrated by vaporization of the solvent to afford a crystallizate of 3-ethoxy-16-methyl-1,3,5(10)-estratriene-16,17-diol dipropionate. This compound has the structural formula

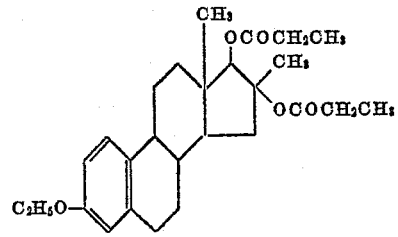

Example 18

A solution of 5 parts of 3-methoxy-16-methyl-1,3,5(10)-estratriene-16,17-diol in 160 parts of anhydrous acetone is treated with 1 part of concentrated hydrochloric acid; the reaction mixture is heated under reflux for 2 minutes and then allowed to stand at about 25° C. for 18 hours. The product precipitated by dilution of the mixture with 750 parts of ice water is collected on a filter and recrystallized from aqueous ethanol containing a trace amount of pyridine. The compound thus obtained is the acetonide of 3-methoxy-16-methyl-1,3,5(10)-estratriene-16,17-diol. It melts at about 141–143.5° C.

and has a specific rotation of about +109° in dioxane solution. The structural formula is

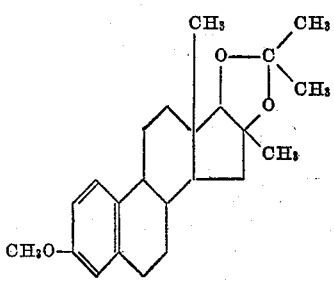

A solution of 1 part of the acetonide in 16 parts of methanol and 1 part of water is made 0.04 molar with respect to hydrogen chloride and is heated under reflux for 30 minutes. Upon concentration of the solution and dilution with water, there is obtained a precipitate of regenerated 3-methoxy-16-methyl-1,3,5(10)-estratriene-16,17-diol.

*Example 19*

A mixture of 14.22 parts of estrone methyl ether, 7.5 parts of paraformaldehyde, 25 parts of dimethylamine hydrochloride and 80 parts of isoamyl alcohol is distilled until a distillate amounting to about 8 parts is removed, following which it is heated under reflux for one hour. Another portion of distillate, amounting to about 20 parts, is collected and discarded. Additional isoamyl alcohol (50 parts) is added, and another distillate, amounting to about 50 parts, is removed. The cooled reaction mixture is then acidified with dilute hydrochloric acid and extracted with several portions of ether. The combined ethereal solution is washed with water until neutral, dried over sodium sulfate, and evaporated to an oily residue. Upon crystallizations of the residue from benzene and drying of the product in a vacuum at 70° C., there is obtained purified 3 - methoxy - 16 - methylene-1,3,5(10)-estratrien-17-one which melts at about 132–133.5° C. and has a specific rotation of about +113° in chloroform solution. Ultraviolet absorption maxima appear at 224 and 286 millimicrons, with respective molecular extinction coefficients of about 17,030 and 2,120. The structural formula is

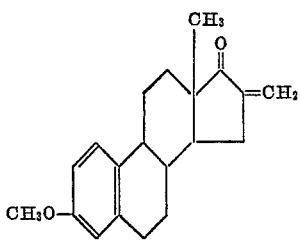

*Example 20*

To a stirred solution of 1.6 parts of 3-methoxy-16-methylene-1,3,5(10)-estratrien-17-one in 25 parts of dioxane, maintained at about 18–25° C., is added 6 parts of cold, 30% hydrogen peroxide followed by a 4 molar solution of sodium hydroxide containing a total of 0.16 part of sodium hydroxide, added in portions over a period of about 30 minutes. An additional quantity of 5 parts of 30% hydrogen peroxide is added in several portions during the next 5 hours. After 15 hours of reaction time the mixture is chilled and diluted with 120 parts of cold water. When separation of the reaction product is complete, the precipitated solid is collected on a filter and thoroughly washed with water. By crystallizations from mixtures of methylene chloride and ethanol there is obtained the purified epoxide which melts at about 169–173° C. and has a specific rotation of about +161° in chloroform solution. This compound is 3-methoxy-16-methyl-16,1'-epoxy-1,3,5(10)-estratrien-17-one, in which the epoxide oxygen is attached in the alpha configuration at position 16. The structural formula is

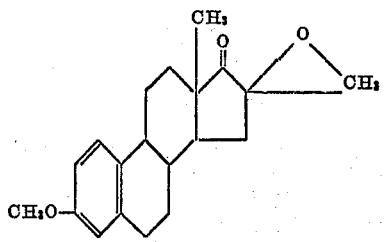

*Example 21*

A solution of 3.12 parts of 3-methoxy-16-methyl-16,1'-epoxy-1,3,5(10)-estratrien-17-one in 700 parts of anhydrous ether is added gradually to a refluxing solution of 3.8 parts of lithium aluminum hydride in 210 parts of anhydrous ether. When the addition is completed, the reaction mixture is heated under reflux for an additional 1½ hours and the excess lithium aluminum hydride is decomposed by adding an ethereal solution of ethyl acetate. A 4 molar solution of sodium hydroxide containing a total of 1.6 parts of sodium hydroxide is added, and the precipitated materials are removed by filtration through diatomaceous earth. The filtrate is distilled to dryness, and the residual glassy product is crystallized from aqueous ethanol. The product obtained in this manner is a hydrate which can exhibit melting points or transition points at about 85–90° C. and at about 123–127° C., each followed by resolidification and final fusion at about 151–153° C. Upon recrystallization from benzene and prolonged drying at about 110° C. in a high vacuum, the product obtained melts directly at about 152–153° C. This compound has a specific rotation of about +78° in chloroform solution. It is the 3-methoxy-16-methyl-1,3,5(10)-estratriene-16,17-diol stereoisomeric at position 16 with the isomer described and characterized in Examples 1 and 18, and is identical with the stereoisomeric 3 - methoxy - 16 - methyl - 1,3,5(10)-estratriene-16,17-diol formed in relatively small amount by the addition of methylmagnesium bromide to 16-ketoestradiol 3-monomethyl ether and hydrolysis of the primary reaction product. The stereoisomer described in this example is also obtained in relatively small amounts by evaporating to dryness the organic solvent crystallization liquors resulting after separation of most of the predominant stereoisomer of 3-methoxy-16-methyl-1,3,5(10)-estratriene-16,17-diol, as described in Example 1, and fractionating the non-volatile residue by dissolving it in a minimum quantity of benzene, pouring the benzene on a silica gel chromatography column, and eluting the column with mixtures of benzene and ethyl acetate containing gradually increasing proportions of ethyl acetate.

*Example 22*

Five parts of the stereoisomeric 3-methoxy-16-methyl-1,3,5(10)-estratriene-16,17-diol as obtained in Example 21 is dissolved in 30 parts of pyridine. Acetic anhydride (20 parts) is added and the reaction mixture is allowed to stand at about 25° C. for 16 hours. The mixture is then gradually diluted with ice water, and the insoluble product which separates is collected on a filter and washed with water. Upon crystallizations from ethanol there is obtained the 17-monoacetate of the diol employed as starting material in the procedure of this example. This compound melts at about 172–175° C. with prior softening and is the 3-methoxy-16-methyl-17-acetoxy-1,3,5(10)-estratrien-16-ol stereoisomeric at position 16 with the product of Example 4.

What is claimed is:
1. A compound of the structural formula

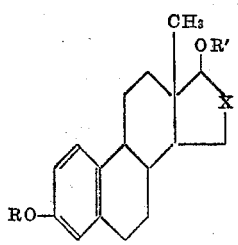

wherein R is a member of the group consisting of hydrogen and hydrocarbon radicals containing fewer than 9 carbon atoms; R' is a member of the group consisting of hydrogen, hydrocarbon radicals containing fewer than 9 carbon atoms, and acyl radicals of hydrocarbon carboxylic acids containing fewer than 9 carbon atoms; and X is a member of the class consisting of

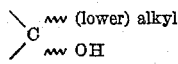

and

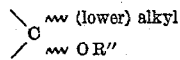

groups wherein R" is an acyl radical of hydrocarbon carboxylic acid containing fewer than 9 carbon atoms.

2. 3-(lower)alkoxy - 16 - (lower)alkyl - 1,3,5(10)-estratriene-16,17β-diol.

3. A compound of the structural formula

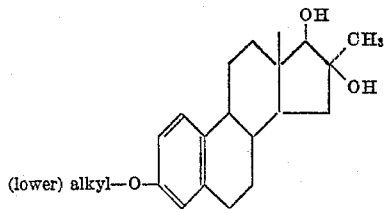

4. 3-methoxy-16α-methyl-1,3,5(10)-estratriene-16,17β-diol.

5. 3-ethoxy - 16α-methyl-1,3,5(10)-estratriene-16,17β-diol.

6. A compound of the structural formula

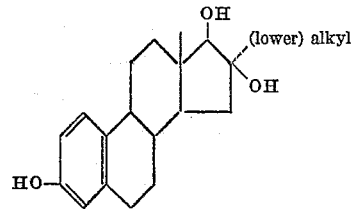

7. 16α-methyl-1,3,5(10)-estratriene-3,16,17β-triol.

8. 3-(lower)alkoxy - 16 - (lower)alkyl - 17β-acyloxy-1,3,5(10)-estratrien-16-ol, wherein the acyl radical is derived from a hydrocarbon carboxylic acid containing fewer than 9 carbon atoms.

9. A compound of the structural formula

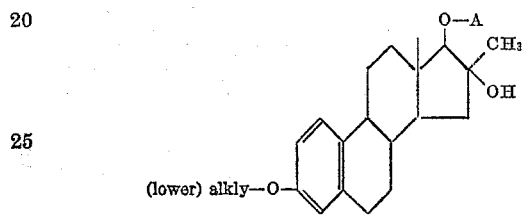

wherein A is the acyl radical of a hydrocarbon carboxylic acid containing fewer than 9 carbon atoms.

10. 3-methoxy - 16 - methyl - 17β-acetoxy-1,3,5(10)-estratrien-16-ol.

References Cited in the file of this patent
UNITED STATES PATENTS

| | | |
|---|---|---|
| 2,280,858 | Schoeller | Apr. 28, 1942 |
| 2,330,215 | Hildebrandt | Sept. 28, 1943 |
| 2,636,043 | Huffman | Apr. 21, 1953 |
| 2,682,548 | Huffman | June 29, 1954 |